(12) United States Patent
Berstis

(10) Patent No.: US 6,873,338 B2
(45) Date of Patent: Mar. 29, 2005

(54) ANTI-MOIRE PIXEL ARRAY HAVING MULTIPLE PIXEL TYPES

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 10/105,117

(22) Filed: Mar. 21, 2002

(65) Prior Publication Data

US 2003/0184665 A1 Oct. 2, 2003

(51) Int. Cl.$^7$ ................................. G09G 5/02
(52) U.S. Cl. .................. 345/596; 345/629; 345/589; 345/55; 348/294; 250/227.2
(58) Field of Search ................. 345/629, 596, 345/597, 589, 630, 631, 581, 598, 599, 55; 348/294, 745, 241; 382/284; 250/227.2

(56) References Cited

U.S. PATENT DOCUMENTS

| | | | |
|---|---|---|---|
| 5,548,305 A | 8/1996 | Rupel | 345/597 |
| 5,648,649 A | 7/1997 | Bridgelall et al. | 235/462.36 |
| 5,946,452 A | 8/1999 | Spaulding et al. | 358/1.9 |
| 5,987,219 A | 11/1999 | Naylor, Jr. et al. | 358/1.9 |
| 6,152,372 A | 11/2000 | Colley et al. | 235/472.01 |
| 6,215,914 B1 * | 4/2001 | Nakamura et al. | 382/284 |
| 6,243,070 B1 | 6/2001 | Hill et al. | 345/589 |
| 6,271,936 B1 | 8/2001 | Yu et al. | 358/1.9 |
| 6,285,799 B1 | 9/2001 | Dance et al. | 372/261 |
| 6,380,539 B1 * | 4/2002 | Edgar | 250/339.05 |
| 6,456,339 B1 * | 9/2002 | Surati et al. | 348/745 |

OTHER PUBLICATIONS

"Minimize Moire Pattern (scanning)", published by Digital Design and Imaging, downloaded from http://www.godigital—design.com/tips_moire.htm on Nov. 12, 2001.

"Scanned Images Display with Moire, Screen, or Plaid Pattern in Photoshop", Adobe Corporation, downloaded from http://www.adobe.com/support/techdocs/3606.htm on Nov. 12, 2001.

"11.4: Manufacturing of Large Wide–View Angle Seamless Tiled AMLCDs for Business and Consumer Applications", R.G. Greene, J.P. Krusius, D.P. Seraphim, D. Skinner, and B. Yost of Rainbow Displays Inc., Endicott, New York.

* cited by examiner

Primary Examiner—Kimbinh T. Nguyen
(74) Attorney, Agent, or Firm—Robert H. Frantz; David A. Mims, Jr.

(57) ABSTRACT

A two-dimensional array of non-uniformly spaced pixels having a plurality of overlaid pixel sets for avoiding moiré patterns in digital images by avoiding producing an inherent "frequency" or pattern that may interfere with details or harmonics present in the image source, thereby eliminating the occurrence of moiré patterns and the need for application of image processing to remove Moiré patterns. A first set of pixels, (imaging sensors or display elements) are arranged along a two axes according to a non-uniform predictable process. The first set pixels spacing inherently produces non-uniformly spaced and sized "gaps", in which additional sets of pixels potentially having a different characteristics from the first set, may be placed, thereby yielding an array comprised of multiple overlaid arrangements of non-uniformly spaced pixels. As such, images samples from or displayed on the additional sets of pixel sensors also avoid production of Moiré patterns.

15 Claims, 9 Drawing Sheets

*Prior Art*

ANTI-MOIRE PIXEL ARRAY HAVING MULTIPLE PIXEL TYPES

CROSS-REFERENCE TO RELATED APPLICATIONS (CLAIMING BENEFIT UNDER 35 U.S.C. 120)

This invention is related to U.S. patent application Ser. Nos. 10/015,880, 10/015,492, and 10/015,856 filed by Viktors Berstis on Dec. 13, 2001, Dec. 13, 2001, and Dec. 13, 2001, respectively, all of which are commonly assigned.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related patent applications, U.S. patent application Ser. Nos. 10/015,880, 10/015,492, and 10/015,856 filed by Viktors Berstis on Dec. 13, 2001, Dec. 13, 2001, and Dec. 13, 2001, respectively, are hereby incorporated by reference in their entireties, including figures.

BACKGROUND OF THE INVENTION

1. Field of the Invention

This invention relates to the arts of imaging and image processing, including sensor design and moiré reduction technologies.

2. Background of the Invention

Well-known imaging technologies include film (e.g. analog), digital, and analog-digital hybrid approaches. Film imaging processes use a set of lenses to focus an image onto a film sheet which is impregnated with grains of material reactive to the spectrum to be recorded, such as visible light, infrared ("IR"), or X-ray. The grains are randomly arranged in each sheet of film, and thus reproduction of the image on the developed film has a certain resolution based on the size and density of these grains.

In digital imaging, a sensor of uniformly-arranged sensing elements is used to capture "bits" or pixels of the image. Turning to FIG. 1, the system components (10) of a typical digital camera are shown. In this example, a scene or original item (1) is digitally imaged using a two-dimensional array (7) of sensors such as an array of charge-coupled devices ("CCD"). The image of the scene is focused onto the array (7) by a lens (6), and a shutter (not shown) may be used to provided a specific duration of exposure. The sensor elements are arranged with uniform spacing into rows and columns.

Turning to FIG. 2, more details of a typical two-dimensional sensor array (7) are shown. The sensor element columns are uniformly spaced at distance $d_1$ from each other according to a linear function such as:

x-axis position of sensor in column $n = P_n = (n-1) \cdot d_1$ where the array is comprised of N sensor columns, n is the column number ranging from 1 through N, and $d_1$ is the uniform distance between the sensor columns.

Likewise, the sensor element rows are uniformly spaced at distance $d_2$ from each other according to a linear function such as:

y-axis position of sensor in column $m = P_m = (m-1) \cdot d_2$ where the array is comprised of M sensor rows, m is the row number ranging from 1 through M, and $d_2$ is the uniform distance between the sensor rows.

In many two-dimensional sensor arrays, the row-to-row spacing $d_1$ may be equal to the column-to-column spacing $d_2$. The number of columns N may be equal to the number of columns M, as well.

The sensors may in practice be reactive to any range of electromagnetic ("EM") spectrum according to the desired application, such as charge-coupled devices ("CCD") for visible or IR imaging.

Typically, the voltage level on each sensor element is measured and converted (e.g. sampled) to a digital value using an analog-to-digital converter. The sample value is relative to the amount of electromagnetic energy incident on the sensor element. Conversion to digital values are typically performed using an analog-to-digital converter having sufficient resolution (e.g. data width) for the intended application. The digital data set (66) of samples represents a digitized or pixelated copy of the image.

Additionally, mechanical and/or chemical filtering and band separation of the EM spectrum may be performed to produced "separated" data sets, such as use of a color wheel in front of the sensor array, or placement of color filters over the sensor elements themselves.

Moiré patterns are artifacts of certain imaging processes which are perceptible to the human eye, but do not represent actual features or details in the original item imaged. They often resemble crosshatch halftones across all or a portion of a digital image.

For imaging processes in which the original is an analog image, for example a photographic subject, moiré patterns may appear when certain features align with the sensors in the sensor array. For example, a digital photograph of a bug screen on a window often produces noticeable moiré patterns due to the bug screen's uniform grid-like features. The resulting apparent pattern is actually an interference pattern between the physical spacing of features of the original image and the spacing of the sensor array.

Just as in the phenomena of interference patterns between other types of signals, visual moiré patterns may become apparent at "harmonics" or integral multiples of spacing distances of the original image features and the spacing distances of the sensor array. For example, if the repeating features of a photographic subject are focussed onto two-dimensional sensor array having a sensor spacing of 600 dots per inch ("DPI") and a moiré pattern forms, then the same image focused at the same distance on a sensor array having a sensor spacing of 1200 DPI will likely result in the appearance of moiré patterns. Undersampling the image at 300 DPI would also likely result in the appearance of moiré patterns.

Many techniques have been developed to try to reduce moiré patterns which appear in existing digital images, such as application of image processing techniques including Gaussian blurring, "descreening" algorithms, and "despeckle" processes. Most of these have a result of reducing the sharpness of the overall image because they reduce the moiré pattern by spreading energy or brightness from a given pixel to adjacent pixels.

As discussed in the related applications in an example as shown in FIG. 3a, pixel N represents a pixel of a moiré pattern in a single row or column, and in this case, a pattern which is darker than the surrounding pixels, N−1 and N+1. The energy $E_2$ of pixel N is lower than the energy $E_3$ of the adjacent pixels N+1 and N−1. A blurring process applies a partial or weighted averaging among regional or adjacent pixels, such as shown in FIG. 3b, wherein the energy of the pixel in the moiré pattern is slightly increased to $E_2'$, and the energy of the adjacent pixels are slightly decreased to $E_3'$.

While this oftentimes decreases the obviousness or appearance of the moiré pattern to the human observer, it also reduces the "sharpness" or level of apparent detail of the entire image. If the blurring process is applied manually on a regional basis, the degradation to the entire image may be avoided, but the local areas are still degraded and substantial human intervention may be required to do so. Additionally, "edge effects" may become perceptible where the region of processing meets a region of unprocessed image.

So, to date, most digital image post-processing attempts to reduce moiré patterns either result in image degradation, require substantial human operator effort, or both to some degree.

A common technique employed to avoid the generation of moiré patterns in the imaging process is to mechanically move or "jitter" the sensor array such that the array is moved in physical position with respect to the original subject being imaged. In FIG. 4, such a jittering imaging system with a two-dimensional sensor array (7) is shown. An x-axis mechanical jitter drive (40) is coupled to the array (7) such that it's x-axis position is varied slightly over time, usually in a sinusoidal or triangular pattern (41). Likewise, a y-axis jitter drive (42) may jitter the array in an orthogonal direction, also typically in a sinusoidal or triangular pattern (43).

This jittering action allows the array (7) to scan a pattern of points which are not simply an array of uniformly spaced rows and columns, but which represent positions relative to the jittering functions $P_x'(t)$ and $P_y'(t)$. As such, fewer original image sources will have an interference pattern with the dithered sensor pattern, but it is still possible that portions of the original image source may interfere with the dithered sensor pattern to cause localized moiré patterns. Additionally, such jittering mechanisms tend to add expense and failure rate to an assembly such as a digital camera.

In the related applications, a system and method were disclosed which avoids generation of moiré patterns in digital images created with a two-dimensional sensor array, without the use of mechanical jittering mechanisms, intensive image post-processing technologies, or a high degree of human operator manipulation and editing. This new system and method maintained image quality while being readily realizable using current sensor technology, and to preferrably be compatible with widely-used image compression and decompression technologies such as bitmap, JPEG (joint photographic experts) and MPEG image products.

These related inventions provided a means for avoiding moiré patterns in digitized images by employing a two-dimensional sensor array of non-uniformly spaced sensors. This allows the spacing of the sensors to avoid having an inherent "frequency" that may interfere with details or harmonics present in the image source, which eliminates the occurrence of moiré patterns and the need for application of image processing to remove moiré patterns.

Using the related invention, the sensors are placed along a each axis in a non-uniform pseudorandom manner according to a predetermined scheme or function. During imaging, sensors are sampled and stored into a data set which represents non-uniformly spaced image points within the original image, scene or subject. Finally, linear interpolation is preferrably applied to the non-uniformly spaced data set to yield a synthesized uniformly-spaced data set for use in common imaging formats and processing, such as JPEG or MPEG compression and decompression.

Sensor elements, or "picture elements" ("pixels"), known in the art vary widely in size, geometry, dark current, sensitivity, dynamic range or gain, and EM band response, according to the semiconductor processes used to realize them and the specific structural design of the element. For example, some pixel elements are approximately 8 $\mu$m square, while others are as large as 10 $\mu$m or larger. Some pixel elements have extremely low dark currents or wide dynamic range, while still others may possess unusually flat response over a wide range of the EM spectrum, or are specifically enhanced for certain bands of the EM spectrum (e.g. infrared sensors). Pixel size also relates to the resolution or "sharpness" of the captured and digitized image, wherein larger pixel structures usually yield lower resolution images.

Arrays available on the market tend only to comprise one specific pixel type or another, and thus the entire array shares the same general characteristics, advantages, and specifications within some tolerance.

However, as was demonstrated in the related patent application, due to the non-uniform placement of pixels in the anti-moiré, significant unused array space between pixels may be produced in some combinations of 2, 3 or 4 adjacent pixels.

This provides an opportunity to potentially place smaller pixels between the larger pixels in order to increase the number of pixels within the array, and potentially add a second (or more) set of characteristics, advantages, and specifications to the array. In some cases, it may be desirable to "fill in" the gaps with smaller pixels of similar performance characteristics as the larger ones, and in other cases, it may be desirable to fill in the gaps with smaller pixels of dramatically different characteristics.

For example, for an intelligence gathering application wherein visible spectrum images are often compared with similar infrared ("IR") images which were taken using 2 separate imaging systems, it may be desirable to realize an array having both types of pixels in the same array. By managing the focussing optics for separate "shots" but using a single imaging array (e.g. mechanically switching between one optics set to another), high correlation between the two spectrum images may be obtained which avoids parallax effects of using two separate cameras.

In another example for a medical imaging application, one pixel set of IR-sensitive elements may be overlaid with another pixel set of X-ray-sensitive pixels to yield highly correlated image data sets.

In general, this opportunity to "fill in" unused array space with smaller sensors or pixels did not exist until the inventions of the related patent applications were made. It is also important to note that the related patent applications disclose methods and systems for non-uniformly and pseudorandomly distributing sensor elements on sensor arrays, as well as display elements (TFT, LED's, etc.) on display arrays.

Therefore, there is a need in the art for a system and method which allows the unused array space in arrays of sensors and display elements to be used to host smaller sensor or display elements in order to realize unique advantages and functionality of the arrays. Further, there is a need in the art for this system and method to support the physically overlaid arrays to be of different technologies and performance characteristics, such that multiple, highly correlated data sets may be obtained from or displayed with a single physical sensor or display array.

BRIEF DESCRIPTION OF THE DRAWINGS

The following detailed description when taken in conjunction with the figures presented herein provide a complete disclosure of the invention.

SUMMARY OF THE INVENTION

The present invention provides a means for utilizing otherwise empty space within a first anti-moiré sensor or display array, wherein the first anti-moiré array comprises a one or two-dimensionally array of sensor or display elements arranged in a predictable, non-uniform pseudorandom manner. The resulting additional "overlaid" arrays inherit the non-uniform pseudorandom distribution characteristics of the first array, and thus also exhibit anti-moiré imaging or display properties.

The non-uniform distribution and arrangement of the elements allows the array to avoid having an inherent "frequency" or pattern that may interfere with details or harmonics present in the image source (to be sampled or displayed), which eliminates the occurrence of moiré patterns (in the sample data or in the visual presentation), and avoids the need for application of image processing to remove moiré patterns.

The sensor or display elements are placed along each axis in a non-uniform manner according to a predetermined scheme or function. The realized non-uniform spacing of a first set of sensors will inherently provide non-uniformly spaced and sized "gaps", in which a second set of sensors, potentially having a different set of performance characteristics from the first set, may be placed. This yields an array comprised of two (or more) overlaid arrangements of non-uniformly spaced sensor or display elements, each of which may produce or display image data sets relatively free of moiré patterns. The highly correlated data sets may be useful in further image processing, classification, and feature extraction activities such as intelligence gathering, medical imaging, and quality control.

DETAILED DESCRIPTION OF THE INVENTION

The present invention is realized by fabricating a two-dimensional array of elements (sensor elements or display elements), wherein the rows and columns of elements in the array have non-uniform and preferrably pseudorandom spacing according to a predetermined, predictable function, and wherein the elements represent two or more sets of elements. The sets of elements may be of similar types or performance characteristics, or they may be of varying types of sensors (e.g. IR and visible light sets). The method of the invention may be equally well applied to fabrication of a sensor array, such as a CCD imaging array, or to a display array, such as a TFT or LCD display panel.

Figure 1:
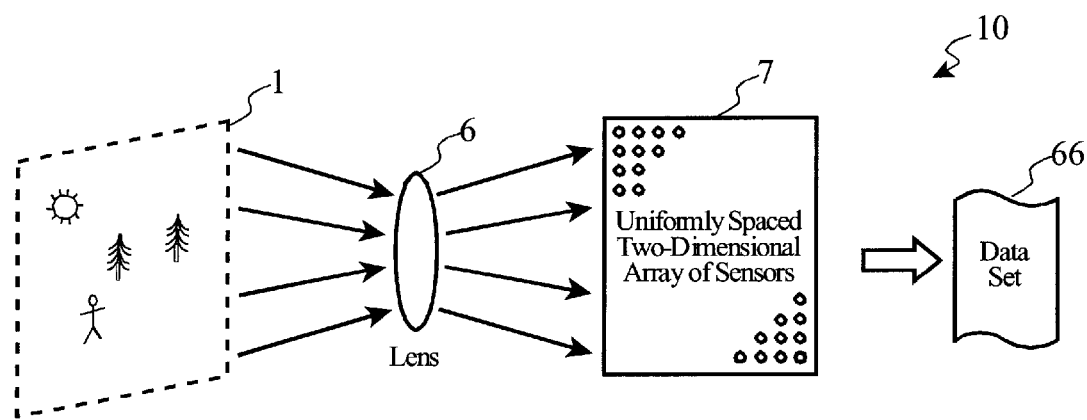
FIG. 1 illustrates the arrangement of components of an imaging system which employs a two-dimensional sensor array, such as a digital camera.
Figure 2:
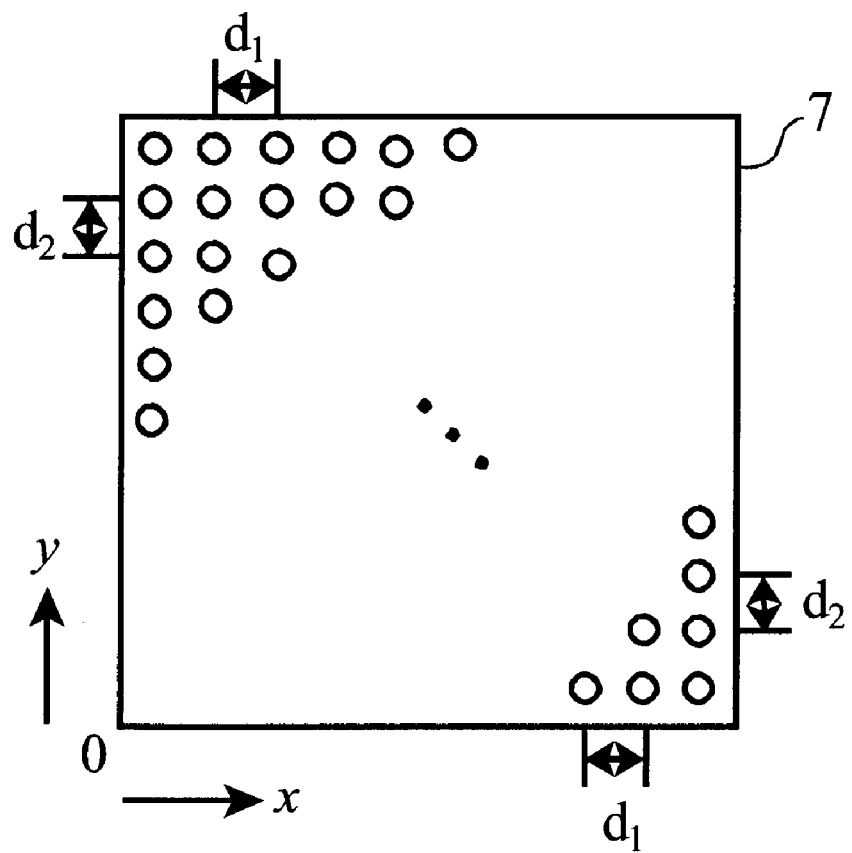
FIG. 2 shows details of a two-dimensional sensor array.
Figure 3A:
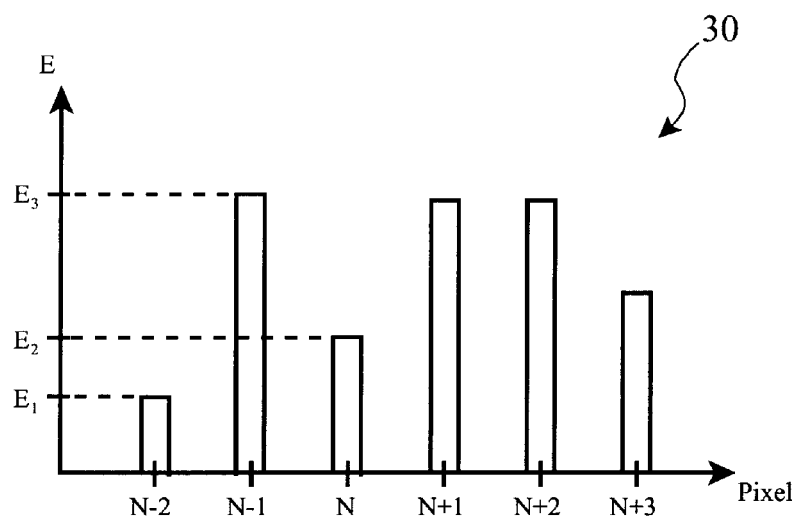
FIGS. 3*a* and 3*b* provide illustration of blurring processes often used to reduce the appearance of moiré patterns in digital images.
Figure 3B:
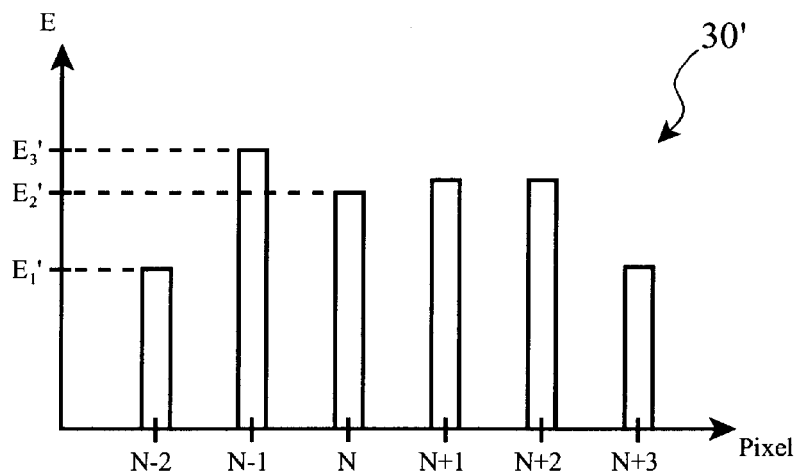
Figure 4:
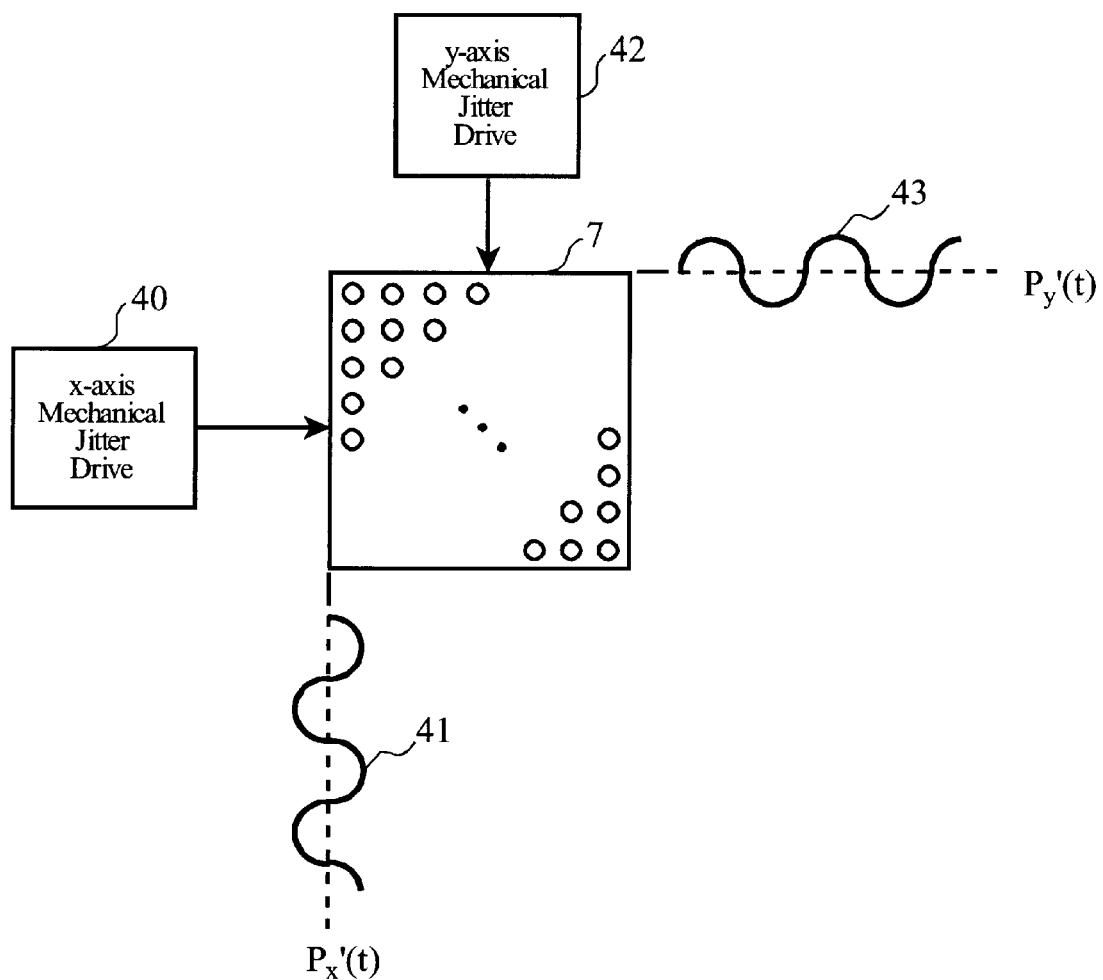
FIG. 4 shows the mechanical dithering action on a typical two-dimensional sensor array.
Figure 5:
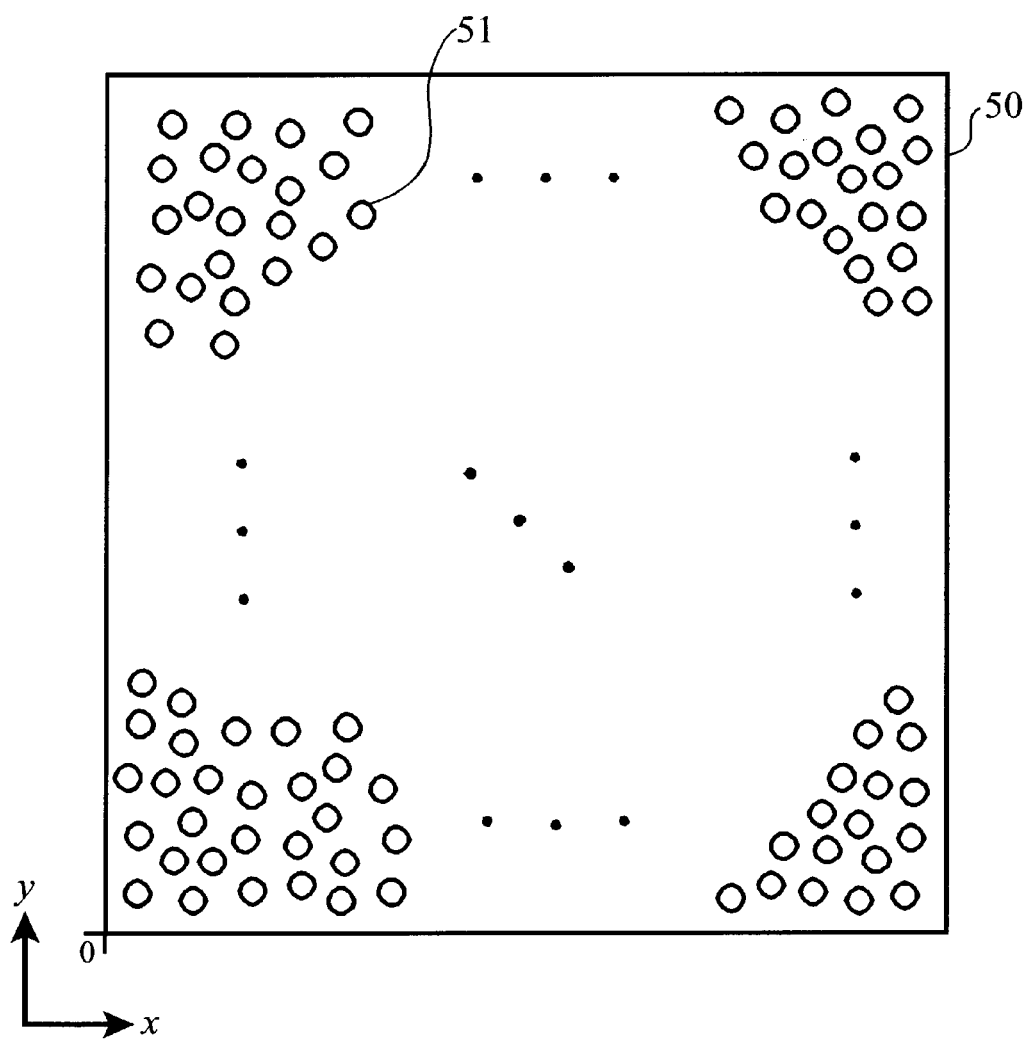
FIG. 5 illustrates the sensor placement for a two-dimensional sensor array according to a related invention.
Figure 6:
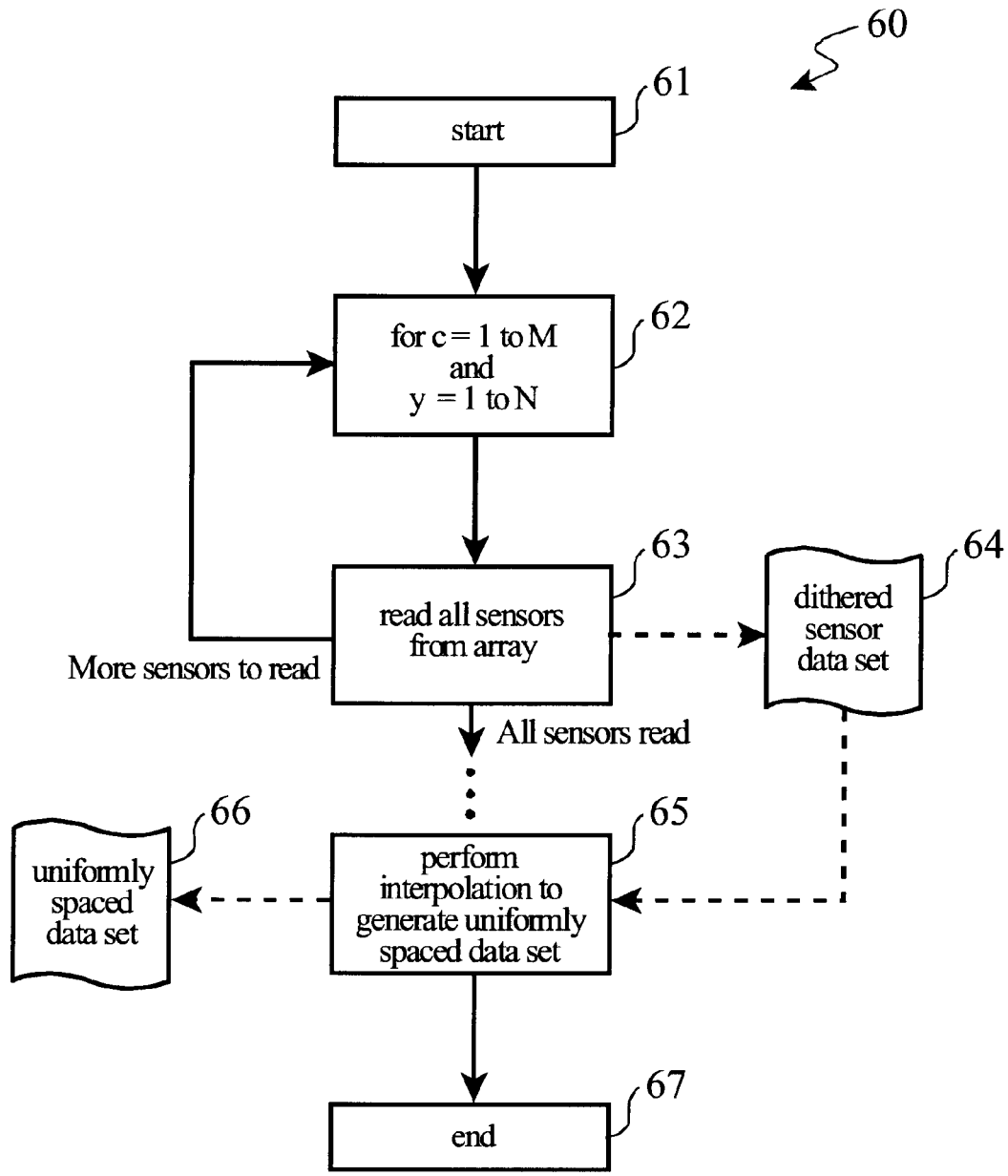
FIG. 6 sets forth the logical process of a related invention to yield a data set representing uniformly-spaced sample points from the non-uniformly spaced sensor set according to the present invention.

Turning to FIG. 5, the arrangement of elements in a two-dimensional array according to the related invention is shown. The spacing between adjacent elements in the x and y axes are non-uniform, which avoids the physical creation of a "frequency" in the sampling operation, in the case of a sensor array, or display operation, in the case of a display array.

For example, where c is the column number of an element in a given row r, $d_{c=1}$ is not equal to $d_{c=2}$, and $d_{c=2}$ is not equal to $d_{c=3}$, and so forth. Further, these distances should not be harmonic multiples of each other, such as having $d_{c=1}=(½) d_{c=2}$ and $d_{c=2}=(¼) d_{c=3}$, etc. As such, the function used to determine the element-to-element spacing within a row (e.g. the column-to-column spacing in the x-axis) of the two-dimensional array can be generally expressed as:

$$\text{Position of sensor at column } c = c \cdot P_{col\_std} + F_x(n)$$

as well as the element-to-element spacing within a column (e.g. the row-to-row spacing in the y-axis):

$$\text{Position of sensor at row } r = r \cdot P_{row\_std} + F_y(n)$$

where $P_{col\_std}$ is the standard or uniform spacing between columns of elements, $P_{row\_std}$ is the standard or uniform spacing between columns of elements, and n is the number of the pixel in the array (e.g. for a 1 mega-pixel array, 1<n<1 million). The pixel number, for example, may be assigned as a combination of row and column position, such as:

$$n = (row\_width * (r-1)) + c$$

where row_width is the number of pixels in a single row (e.g. the number of columns in a row). In this example, $F_x$ and $F_y$ are functions which provide x-axis and y-axis position offset values, respectively, in a non-uniform, preferrably pseudorandom manner. $F_x$ and $F_y$ may be a short, predictable pseudo-random number patterns or sequences, nonlinear mathematical functions which have broad spectral or harmonic content (e.g. ramp or sawtooth functions), or based on a predictable process such as a cyclic redundancy check ("CRC") polynomial.

According to the preferred embodiment, a CRC process is used to generate the pseudo-random position offset values, as this avoids the need for large look up tables and only requires three parameters to "seed" the determination of all the offset values. While the intermediate results of a CRC process produce a sequence of numbers which are pseudo-random in nature (e.g. non-uniform), CRC processes are entirely predictable in that when they are performed over the same set of data, they yield exactly the same set of intermediate values.

Therefore, a predictable and repeatable number generator can be implemented by seeding a CRC process with an initial CRC value, and then recirculating the data through the algorithm for n iterations, each iteration of the process generating an intermediate value which can be converted into an offset value for element position n. Then, to recreate the sequence of offset values for a given array, the process must only be provided the CRC exclusive-OR ("XOR") polynomial, the "seed" value, and the conversion method for extracting an offset value from the CRC value at each iteration.

Table 1 shows the pseudocode for such a CRC process, in which an initial CRC value is used to start the process. Then, in each iteration of the offset determination, the current value of the CRC is exclusive-OR'ed on a bitwise basis with a polynomial, and an offset value is extracted from the modified CRC.

This offset value for the $n^{th}$ iteration is the offset value for the $n^{th}$ element, where $n=(c-1)+r$. The offset value is preferably extracted from the CRC value by taking certain bits from the CRC value (e.g. $b_6$, $b_4$, $b_3$, and $b_1$ of an 8-bit CRC), and concatenating them to yield an offset value in binary format. Then, this offset value can be scaled to range within an acceptable physical offset deviation in either axis.

Next, the modified CRC value is barrel shifted left (e.g. shifted to the left whereby the most significant bit is moved to the least significant bit) until a "1" is obtained in the least significant bit of the CRC. This shifted version of the CRC because the CRC value to be XOR'ed in the next iteration for pixel n+1.

TABLE 1

Example CRC Pseudo Random Number Generator Process

```
CRC = seed_value
For pixel = 1 to N
    CRC = CRC XOR polynomial
    offset = concatentated tap bits of CRC
    F_x(pixel) = scaled offset
    barrel shift left CRC until least significant bit is a "1"
next_pixel
```

This type of process can be used to generate the x-axis offsets as well as the y-axis offsets for the elements in the array. Preferably, different seed values are used for x-axis offsets and y-axis offsets to provide a more random and non-uniform distribution of the sensors.

For example, consider a two-dimensional CCD array which is 10.46 mm wide having 754 sensor columns, and 3.38 mm tall with 244 sensor rows, with each sensor being 6.0 μm square (e.g. one-half of a sensor array for a standard 780 by 488 sensor array). In this case, a traditional uniformly spaced two-dimensional array would have the columns of sensors spaced uniformly at approximately 14 μm apart, and the rows are uniformly spaced at the same 14 μm. For the purposes of this example, also assume that the minimum spacing between adjacent sensors is 2 μm to maintain a desired level of anti-blooming isolation. For non-square sensors and arrays in which row-to-row spacing and column-to-column spacing are not equivalent, different values of these geometries may be accommodated.

To realize a two-dimensional array of similar resolution (e.g. same number of pixels where N 754*244=183,976), a pseudo-random non-uniform number function (PSNUF) is defined using an 8-bit wide CRC ($b_7b_6b_5b_4b_3b_2b_1b_0$ with $b_7$ being the most significant bit) seed value of b'1010010 (h'D2) for the x-axis offset, a seed value of b'10110111 (h'B7) for the y-axis offset, and an XOR polynomial of b'10011011 (h'9B), where b' denotes binary notation and h' denote hexadecimal notation.

Further, the offset values in this practical example may be determined by "tapping" and concatenating $b_6b_4b_3b_1$ from the CRC value in the $n^{th}$ iteration for the sensor n to produce a 4-bit offset value ranging non-uniformly between and including 0 and 15 in decimal notation. In this example, we may use offset values 0 through 7 to represent left and down offsets from the standard grid, and values 8 through 15 to represent right and up offsets from the standard grid. Alternatively, another bit from the CRC could be tapped as a sign bit, with left/down offsets being negative and right/up being positive, etc.

Finally, the offset values are scaled to fit the maximum allowable offset range. In this example, if the sensor fabrication process requires a minimum spacing of 2.0 μm to maintain a desired level of anti-blooming isolation, the variance from uniform center spacing which is allowable in this situation is 14 μm less 6 μm less 2 μm, or 6 μm. So, the scaling process of Table 2 can be employed to determine the physical offset of a particular sensor.

TABLE 2

Example Offset Scaling Process

```
If 0 ≤ offset ≤ 7 then
    direction = left or down
    offset_distance = (offset / 8 ) * P_offset_max
else
    direction = right or up
    offset_distance = [(offset - 7) / 8 ] * P_offset_max
endif
```

So, in this example, the first few x-axis offset values given the x-axis seed value, polynomial and tap bits, would be 10, 7, 9, 13, 9, 7, 15, etc., for the first, second, third, etc., sensors. After scaling, the physical x-axis offsets would be right 2.25 μm, left 5.25 μm, right 1.5 μm, right 4.5 μm, etc., for the first, second, third, etc., sensors.

For the y-axis offset values, the first few offset values (using the y-axis seed value) would be 2, 15, 11, 1, 3, 11, 4, 7, etc., for the first, second, third, etc., sensors, which scales to down 1.5 μm, up 6 μm, up 3 μm, down 0.75 μm, down 2.25 μm, etc.

Employing such a distribution function, a new two-dimensional array is preferably fabricated with the non-uniformly spaced sensor elements according to the non-uniform functions $F_x$ and $F_y$, instead of the uniform spacing of well known sensor arrays.

This process is preferably performed in the silicon design and layout phase, such as the phase of design of a CCD sensor area array or TFT display panel. This allows for the manufactured array to incorporate the sensors with the x-axis spacing of the function $F_x$ and y-axis spacing of the function $F_y$, such that when it is used for imaging, moiré patterns will not form in the image.

Advantages of using such an anti-moiré sensor can be enhanced by coupling it with the use of an anti-moiré display which uses the same dimensions (number of rows and columns) and distribution functions ($F_x$ and $F_y$), providing a perfect match and reproduction of the sampled image. It is anticipated that certain industry standards bodies and/or manufacturers may adopt certain dimensions and distribution functions such that a sensor array manufactured by a first supplier may match a display provided by a second supplier. This would allow digital cameras to specify which display types they match exactly, for example, much like the existing EGA, VGA, S-VGA, etc., denominations provide for present day uniformly-spaced sensors and display arrays.

However, it may also be desirable to either transform non-uniformly spaced sample sets to uniformly spaced data sets for compatibility with other processes and devices, such as conversion to bitmaps (JPEG, TIFF, etc.). Additionally, it may be desirable to display uniformly spaced data sets on the improved non-uniformly spaced displays, thereby requiring conversion of uniformly-spaced data sets to matching non-uniformly spaced data sets.

Figure 7:
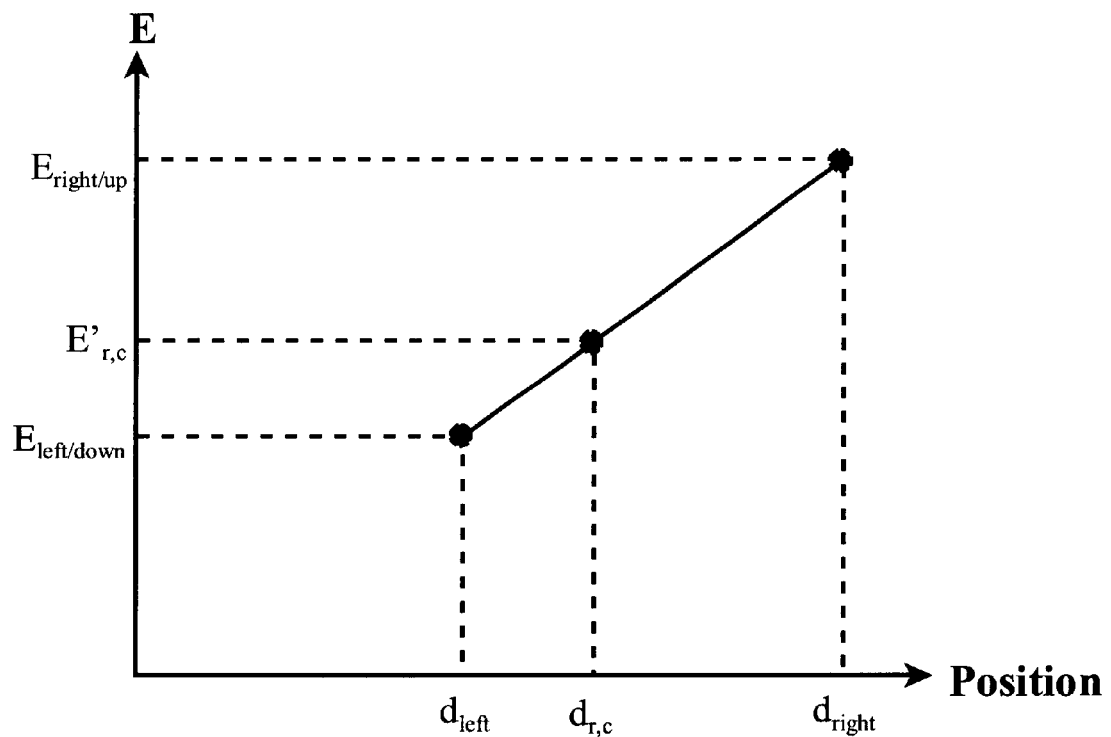
FIG. 7 graphically depicts the interpolation process of a related invention, which is equally applicable to the present invention.

To accomplish the first type of conversion, interpolation may be performed between each non-uniformly spaced data sample to create synthesized data values for a two-dimensional uniformly-spaced data set. For example, as shown in FIG. 7, for a pixel at column n in a given row in a uniformly spaced data set (68), the closest surrounding data values from the non-uniformly spaced data set (64) may be used to calculate its value using any of many well known interpolation methods, where $E_n$ is the data value (energy, brightness, etc.) for the interpolated pixel on the given row, $d_{left}$ is the distance from the interpolated pixel to the closest actual data sample to the left (in the x-axis) and $E_{left}$ is the data sample value of that left neighbor; $d_{right}$ is the distance from the interpolated pixel to the closest actual data sample to the right (in the x-axis) and $E_{right}$ is the data sample value of that right neighbor. In some applications, interpolation which takes into account individual pixel responsiveness curves and offsets may be in order (e.g. when using sensors with a nonlinear sampling characteristic), and interpolation considering adjacent row data samples in the y-axis (e.g. above and below) may be employed.

So, an array of evenly spaced data samples (68) for c=1 to C columns and for r=1 to R rows, is may be generated from the dithered data set (64), which can then be readily processed by common image compression and decompression technologies such as JPEG and MPEG utilities.

Similarly, a uniformly-spaced data sample set, such as a JPEG image file, may be interpolated to produce a non-uniformly spaced data set for display on a given display type.

By employing the spacing technique of the elements in the two-dimensional sensor array, a two-dimensional image data set which is free of inherent element spacing frequencies and patterns can be obtained which avoids the creation or generation of moiré patterns in the first place.

According to an advanced realization of the invention, each non-uniformly spaced element array is assigned a reference identifier which is associated with particular distribution functions and seed values. In this way, several manufacturers may produce a number of arrays (sensor or display) having the same distribution pattern, and users of those arrays may interpret the data according to the manufacturer's specification of the distribution function. For the two-dimensional array of the previous example, the seed values could be combined with the polynomial value(s) to identify its distribution scheme, such as D29B-B79B. As such, this could be named the "alpha" array, so that image data files produced by an alpha sensor array (e.g. a camera with an alpha array) could be directly displayed without interpolation on an alpha display (e.g. an alpha-compliant TFT computer or TV display).

It is further recommended that data files containing samples from such arrays and sampling processes be identified, either within the file (e.g. a header area) or in naming convention, so that other processes may properly identify the distribution function of the sample data.

As previously mentioned, industry consortiums may be motivated to determine "standards" for distribution functions such that multiple manufacturers could produce "compatible", equivalent or interchangeable sensor arrays and data files.

So, the inventions of the related patent applications provide a method for arranging a first set of non-uniformly spaced sensor or display elements. As can be visually observed from FIG. 5, though, depending on the size of the elements, maximum allowable offsets and minimum inter-pixel spacing, significant "gaps" may be produced between certain sets of surrounding pixels.

Returning to our example of a sensor fabrication process which requires a minimum inter-pixel spacing of 2 μm to maintain a desired level of anti-blooming isolation, a uniform center spacing 14 μm, pixels sizes of 6 μm, a maximum offset in a given axis was determined to be 6 μm. In such a case, two pixels adjacent in the x-axis, for example, for which the leftmost pixel is assigned (by the non-uniform placement function) a maximum left offset, and for which the rightmost pixel is assigned a maximum right offset, a gap of up to 12 μm may be created in the axis. The same principle applies to sets of pixels vertically related to each other in the y-axis, such that each gap between four pixels (a leftmost, rightmost, uppermost and lowermost) will range in size as such:

$$\text{min\_inter-pixel\_spacing} < x_{gap} < \text{max\_x-axis\_offset}$$

$$\text{min\_inter-pixel\_spacing} < y_{gap} < \text{max\_y-axis\_offset}$$

According to the present invention, these gaps are searched for large enough spaces to accommodate pixels of a secondary, tertiary, etc., sets of pixels. Because the initial non-uniform pattern of the first set of pixels is determined by a known and predetermined function, the available "host" gaps for the secondary and subsequent pixel sets are also known and deterministic.

According to the preferred embodiment, the sets of pixels to be arranged are first sorted by size, typically with the largest being designated as the first set, the second largest being designated as the second set and so forth. In some cases, it may be desirable to place a set of pixels first which are not the largest of the pixel types.

Next, a pseudo-random non-uniform number function (PSNUF) is applied to place a one or two-dimensional array of pixels from the first (largest) set of sensors, as previously described in the related patent applications.

Then, the second set (second largest) pixels are placed in suitable gaps between elements of the first set by searching every set of four (left, right, upper and lower) pixels in the first set, determining the x- and y-axis dimensions of the gap produced bounded by the set of four, and placing a pixel from the second set in each gap which provides sufficient space to host the pixel. As such, a second computation related to the placement of the second type of pixel for each set of four of the first set of pixels yields a logical value (yes/no, true/false).

Subsequently, each smaller set may be placed in the previously unoccupied sufficiently-large gaps until all gaps are filled with pixel from pixel sets.

Figure 8:
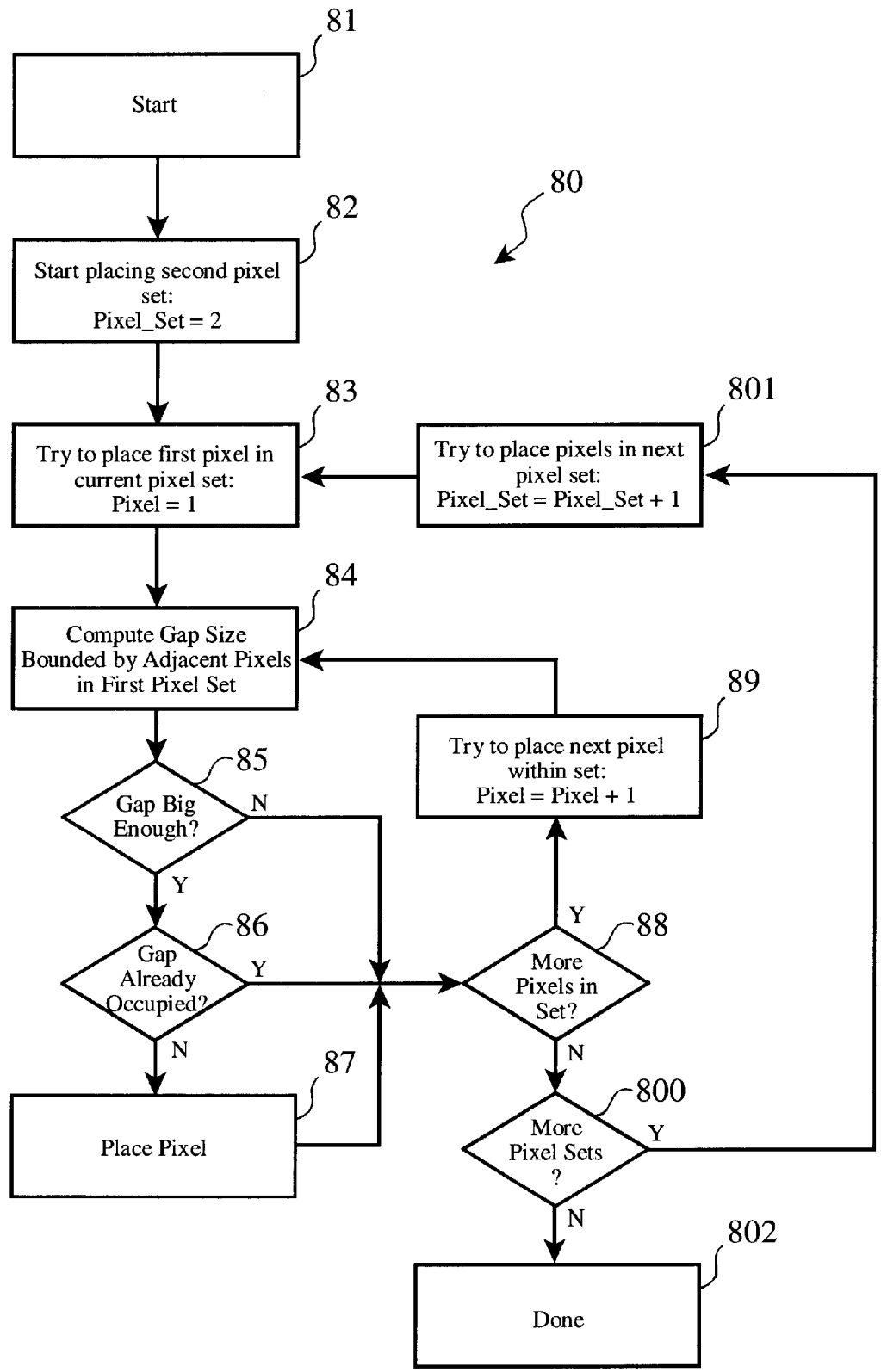
FIG. 8 sets for the logical process of the present invention.

Turning to FIG. 8, the logical process of the invention (80) is illustrated, which starts after the first set of pixels have been placed according to a non-uniform function (as previously described). Starting with the second set of pixels (82), each pixel in the array from first to last pixel (83, 88), the gap dimensions between the adjacent pixels of the first set of pixels is determined (84). If the array being defined is a one-dimensional array (e.g. a linear array), the gap is only determined in one axis. If the array being defined is a two-dimensional array (e.g. an area array), the gap size is determined for both axes.

If the gap is sufficient to host the current pixel (85), then a check is made to see if the gap is already occupied. For an array of two sets of pixels, this step will always yield a "no" result. However, for arrays of 3 or more sets of pixels, this step may yield a "yes" result if the gap was sufficient to host a pixel from a previously placed set of pixels. If the gap is not sufficient to host the pixel (85), the pixel is not placed and processing continues to the next pixel in the current set.

If the gap is not already occupied (86) by another pixel (from another pixel set), and it is sufficient to host the current pixel, then the pixel is placed (87) in the gap, and the gap is marked as "occupied" for future considerations for other pixels from other pixel sets.

Next, a check is made to see if more pixels in the current pixel set are to be placed (88), and if so, the next pixel (89) is processed accordingly.

Once all pixels in a pixel set have been considered and placed, a check is made to see if any more pixel sets are to be overlaid on the array (800). If so, the next pixel set is processed (801), pixel by pixel as previously described (83, 84, 85, 86, 87, 88, 89, 801, 800).

When all pixels in all pixel sets have been processed and considered for placement, the process is complete (802). This process then can handle infinitely large (or small) sets of pixels, and an infinite number of pixel sets.

In this example, the sets of pixels are placed in priority order from first set to last set. According to the preferred embodiment, the sets are sorted and ordered according to size, such as 10 μm pixels first, followed by 8 μm pixels, and then by 6 μm pixels. However, alternate priority schemes could be adopted, such as IR pixels first, high-sensitivity visible light pixels next, and high-precision pixels last.

Figure 9:
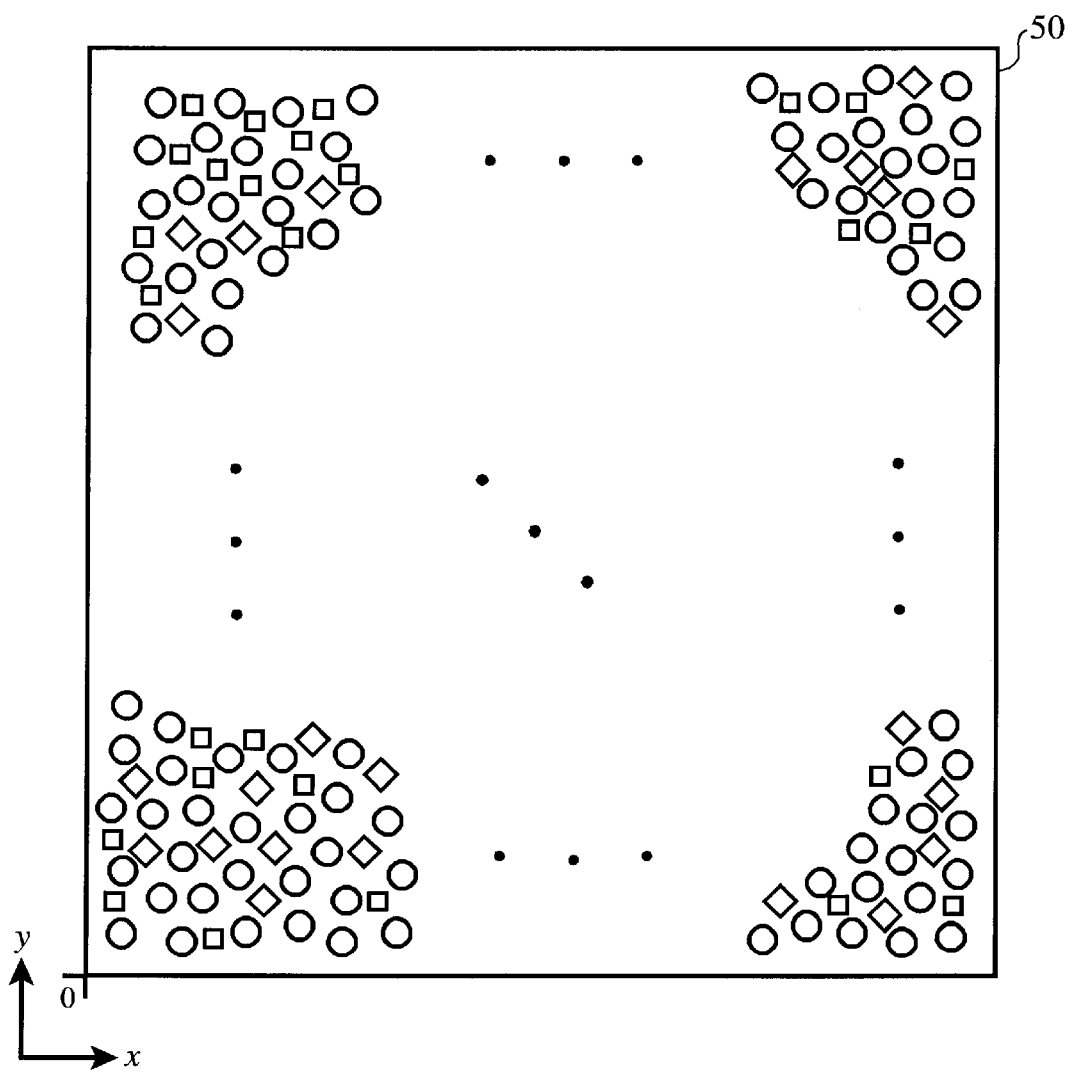
FIG. 9 provides an illustrative example of a two dimensional array comprised of three sets of sensors according to the present invention.

FIG. 9 provides an illustration of a potential pixel array arrangement where a second and third pixel set have been placed into the gaps between the pixels of FIG. 5 (e.g. the first pixel set). In this illustration, the circles represent the first, larger pixel set, the diamonds represent the second, smaller pixel set, and the squares represent the third and smallest pixels. It is readily apparent from this illustration that the pattern of placement of all three pixel sets is non-uniform, thereby allowing the images sampled by or displayed on all three pixel sets to avoid moiré patterns.

In an alternate embodiment of the invention, the method presented herein may be applied to the manufacture and control circuitry of a cathode ray tube ("CRT") display, such as a computer display or television set. The mask used to deposit the phosphor-based compound on the inside surface of the CRT may be altered to incorporate multiple pixel sets with non-uniform spacing. Correspondingly, the electron beam control circuitry may be adapted to sweep rows and columns according to the same non-uniform distribution functions, and to preferrably adjust beam intensity and dispersion according to pixel size to produce a desirable pixel clarity. In this alternate embodiment, the illuminated CRT pixels would correspond to previous discussions of display elements, and CRT's could be produced to match the pixel arrangements of certain imaging sensors so that direct display of data sets from these imaging sensors could be performed without interpolation.

While certain details of a preferred embodiment have been disclosed, and certain examples have been given to illustrate the invention in a more understandable manner, it will be recognized by those skilled in the art that the spirit and scope of the present invention is not limited to these examples and embodiment details. For example, certain terms including x-axis, y-axis, row, column, left, right, above and below, have been adopted to give a frame of reference. These terms, however, should not be interpreted in a limiting manner, as other terms such as horizontal/vertical, radial/angular, north/south/east/west, etc., can be used to describe the invention in other frames of reference.

Further, the invention may be employed for a wide range of information gathering, imaging and display applications, not just photographic and visible spectrum imaging, such as magnetic resonance imaging, radar and sonar imaging, quality control inspection, etc. Therefore, the scope of the present invention should be determined by the following claims.

What is claimed is:

1. A method for arranging an array of picture elements (pixels) comprising the steps of:

selecting a non-uniform predictable distribution function from the group of a short pseudo-random number sequence, a nonlinear mathematical function having broad spectral content, and a cyclic redundancy check polynomial-based process;

arranging a first set of pixels along at least one dimensional axis according to said non-uniform predictable distribution function, resulting in non-uniformly spaced non-uniformly sized gaps between the pixels of the first set; and arranging at least one additional set of pixels within said non-uniformly spaced and non-uniformly sized gaps between the pixels of the first set by placing pixels from said additional set(s) into appropriately sized gaps, thereby producing a composite array having at least one additional array of non-uniformly spaced pixels overlaid on the array of first set of pixels in which all pixels are spatially noncoincident.

2. The method as set forth in claim 1 wherein said steps of arranging pixels comprises arranging image sensor elements.

3. The method as set forth in claim 1 wherein said steps of arranging pixels comprises arranging image display elements.

4. The method as set forth in claim 1 wherein said steps of arranging said first set of pixels comprises arranging pixels along two dimensional axes to produce an area pixel array.

5. The method as set forth in claim 1 further comprising the steps of:

assigning a reference identifier to said composite array; and using said reference identifier to determine direct compatibility between a sampled image produced by a composite sensor pixel array and display capabilities of a composite display pixel array.

6. A computer readable medium encoded with software for arranging an array of picture elements (pixels), the software causing a computer to perform the steps of:

selecting a non-uniform predictable distribution function from the group of a short pseudo-random number sequence, a nonlinear mathematical function having broad spectral content, and a cyclic redundancy check polynomial-based process;

placing a first set of pixels along at least one dimensional axis according to said selected non-uniform predictable distribution function, resulting in non-uniformly spaced non-uniformly sized gaps between the pixels of the first set; and placing at least one additional set of pixels within said non-uniformly spaced and non-uniformly sized gaps between the pixels of the first set by inserting pixels from said additional set(s) into appropriately sized gaps, thereby producing a composite array having at least one additional array of non-uniformly spaced pixels overlaid on the array of first set of pixels in which all pixels are spatially noncoincident.

7. The computer readable medium as set forth in claim 6 wherein said software for performing the steps of placing pixels comprises software for placing image sensor elements.

8. The computer readable medium as set forth in claim 6 wherein said software for performing steps of placing pixels comprises software for placing image display elements.

9. The computer readable medium as set forth in claim 6 wherein said software for performing steps of placing said first set of pixels comprises software for placing pixels along two dimensional axes to produce an area pixel array.

10. The computer readable medium as set forth in claim 6 further comprising software for performing the steps of using a reference identifier to determine direct compatibility between a sampled image produced by a composite sensor pixel array and display capabilities of a composite display pixel array.

11. A composite array of picture elements (pixels) comprising:

a first array of pixels having a first set of pixels arranged along at least one dimensional axis according to a non-uniform predictable distribution function, and having non-uniformly spaced non-uniformly sized gaps between the pixels of said first set, said distribution function being selected from the group of a short pseudo-random number sequence, a nonlinear mathematical function having broad spectral content, and a cyclic redundancy check polynomial-based process; and at least one additional array of pixels overlaid upon said first array, said additional array(s) each having an additional set of pixels placed within said non-uniformly spaced and non-uniformly sized gaps between the pixels of the first pixel set, thereby yielding a composite array of pixels in which each array has non-uniform predictable spacing in which all pixels are spatially noncoincident.

12. The composite pixel array as set forth in claim 11 wherein said pixels comprise image sensor elements.

13. The composite pixel array as set forth in claim 11 wherein said pixels comprise image display elements.

14. The composite pixel array as set forth in claim 11 wherein said pixels comprise first set of pixels and said additional sets of pixels are arranged along two dimensional axes to provide an area pixel array.

15. The composite pixel array as set forth in claim 11 further comprising an associated reference identifier to said composite array which identifies said non-uniform predictable scheme for said pixel arrangement such that said reference identifier may be used to determine direct compatibility between a sampled image produced by a composite sensor pixel array and display capabilities of a composite display pixel array.

* * * * *